(12) United States Patent
Choi et al.

(10) Patent No.: US 8,010,808 B2
(45) Date of Patent: Aug. 30, 2011

(54) DATA RECOGNITION APPARATUS FOR COPY PROTECTION AND METHOD THEREOF AND RECORDING MEDIUM THEREOF

(75) Inventors: Kihyun Choi, Gyeonggi-do (KR); Dongryeol Shin, Gyeonggi-do (KR)

(73) Assignee: Sungkyunkwan University Foundation for Corporate Collaboration, Suwon, Gyeonggi-Do (KR)

( * ) Notice: Subject to any disclaimer, the term of this patent is extended or adjusted under 35 U.S.C. 154(b) by 1092 days.

(21) Appl. No.: 11/706,697

(22) Filed: Feb. 13, 2007

(65) Prior Publication Data

US 2008/0098238 A1    Apr. 24, 2008

(30) Foreign Application Priority Data

Oct. 19, 2006  (KR) .................. 10-2006-0101759

(51) Int. Cl.
*G06F 12/14* (2006.01)
*G06F 7/04* (2006.01)
*G06F 21/00* (2006.01)
*H04L 29/06* (2006.01)
*H04N 7/167* (2011.01)
*G08C 19/16* (2006.01)
*G08C 19/12* (2006.01)

(52) U.S. Cl. ............ 713/193; 713/161; 713/165; 726/9; 726/27; 726/30; 380/201; 380/234; 705/51; 705/55; 705/56; 705/57; 340/12.51; 340/13.26

(58) Field of Classification Search .................. 713/193, 713/161, 165; 726/9, 27, 30; 380/201, 234; 705/51, 55–57; 340/12.51, 13.26
See application file for complete search history.

(56) References Cited

U.S. PATENT DOCUMENTS

| 2003/0233573 A1* | 12/2003 | Phinney ................... 713/200 |
| 2004/0030459 A1* | 2/2004 | Henson et al. ............. 701/1 |
| 2004/0186987 A1* | 9/2004 | Piel ........................ 713/2 |
| 2006/0174349 A1* | 8/2006 | Cronce et al. ............. 726/26 |
| 2007/0002707 A1* | 1/2007 | Kwong et al. ........... 369/52.1 |
| 2007/0061893 A1* | 3/2007 | Black et al. ............. 726/27 |

FOREIGN PATENT DOCUMENTS

| KR | 20-0345129 A | 3/2004 |
| KR | 20-0383067 A | 4/2005 |
| KR | 10-2005-0052980 | 6/2005 |
| KR | 10-2005-0110403 A | 11/2005 |

OTHER PUBLICATIONS

Office Action dated Feb. 28, 2008, corresponding to Korean Application No. 10-2006-0101759.

* cited by examiner

*Primary Examiner* — Aravind Moorthy
(74) *Attorney, Agent, or Firm* — Edwards Angell Palmer & Dodge LLP; Kongsik Kim

(57) ABSTRACT

The present invention provides a data recognition apparatus for copy protection which recognizes software distributed through a disc in physically different ways through RFID and a USB memory, a method thereof, and storage mediums therefor. The apparatus comprises a disc insertion section for recognizing a first storage medium in the form of a disc with an RFID tag attached; an RFID reading section for reading the RFID tag; a USB port section for recognizing a second storage medium having the shape of a USB memory; a decoding section for decoding data stored in the first storage medium or the second storage medium; and a transmission section for transmitting the decoded data to the system.

8 Claims, 7 Drawing Sheets

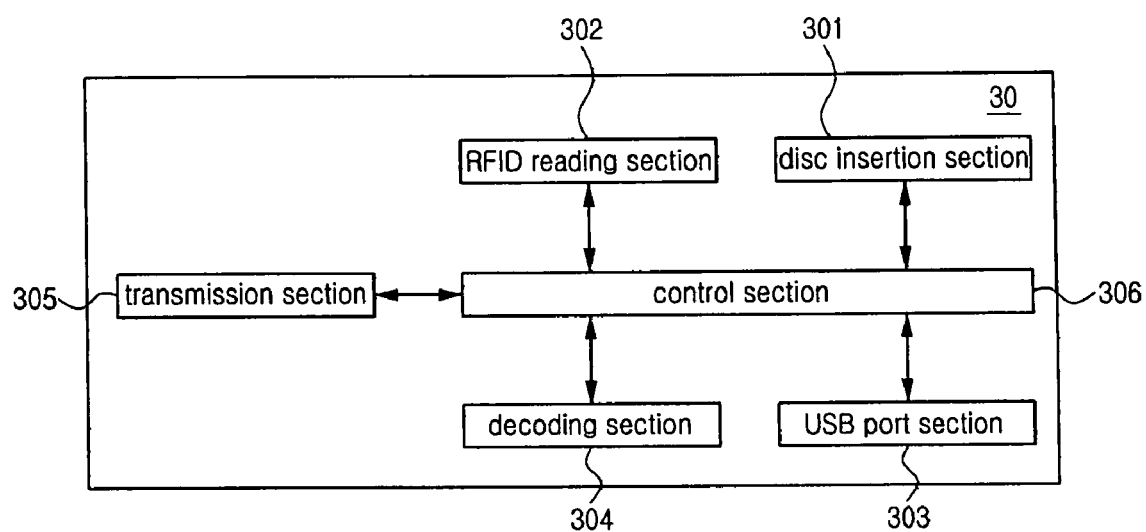

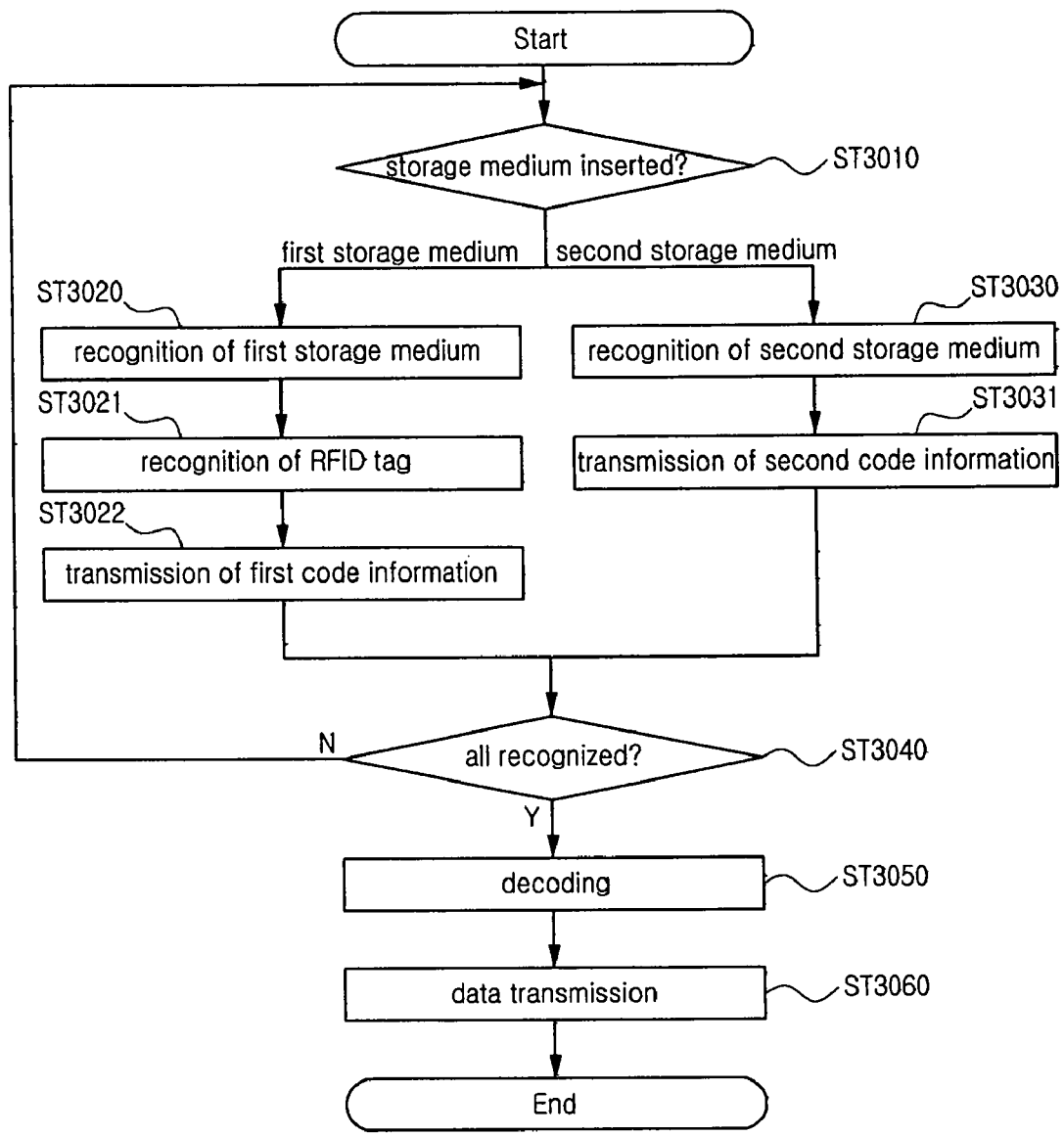

DATA RECOGNITION APPARATUS FOR COPY PROTECTION AND METHOD THEREOF AND RECORDING MEDIUM THEREOF

CROSS-REFERENCE TO RELATED APPLICATION

The present application claims, under 35 U.S.C. §119(a), the benefit of Korean Patent Application No. 10-2006-0101759, filed Oct. 19, 2006, the entire contents of which are hereby incorporated by reference.

BACKGROUND OF THE INVENTION

1. Field of the Invention

The present invention relates to a data recognition apparatus for copy protection, a method thereof, and storage mediums therefor, and more particularly to a data recognition apparatus for copy protection which recognizes software distributed through a disc in physically different ways through RFID (radio frequency identification) and a USB (universal serial bus) memory so as to prevent illegal distribution of the software, a method thereof, and storage mediums therefor.

In more detail, software is distributed in a separated manner in a state in which main data and driving data are respectively coded in a disc with an RFID tag attached and a USB memory device, and a data recognition apparatus having an RFID reader and a USB port is used to decode the software stored on the disc and the USB memory device and provides the decoded software to a user such that the files essential to the execution of a program are concealed to protect the software from being copied.

2. Background Art

According to the Korea Software Property-right Council, the economic loss due to illegal use of software reached 300 billion Won a year in Korea, and when including software developed overseas, the economic loss reached 290 billion dollars in 2004. Therefore, damage to enterprises due to illegal distribution of software reaches several times normal profit margins. While the illegal use of software occurs in both private and commercial realms, it is more difficult to prevent the individual misuse of software than commercial. In the case of individual persons, since software can be illegally distributed over the Internet through P2P (peer to peer), Warez, Web Hard, etc. without permission from a copyright holder, it is difficult to disclose an illegal act or discover the person who initially distributed the software. Also, since the original file name can be changed upon distribution of the software, it is difficult to appropriately prevent the distribution of the software. In this regard, the reproducibility being a characteristic of software serves as a defect of the same software. In consideration of this fact, various software protection techniques have been developed in the art. The two most widely used methods which have proven advantageous are registration online through the Internet and offline validation using a CD-key.

One example of a technique for authenticating a genuine product online is described in Korean Patent No. 0602107 registered on Jul. 10, 2006 and entitled "Software rights management system and its method in network configuration"

The system disclosed in Korean Patent No. 0602107 comprises a client PC in which software is installed, and a license server which receives user information through a network from the client PC and conducts the authentication of the software. The license server comprises a communication module which transmits and receives data to and from the client PC, a product registration module which receives a product serial number and registers a product, a product registration database in which the product serial number is stored, a user authentication module which judges whether a user is an entitled user, and a user authentication database which stores an entitled user's authenticated log. Hence, in the technique disclosed in Korean Patent No. 0602107, in order for a user to obtain permission for the use of the software on the client PC, the user must access the license server through the network. The license server judges whether the user is an entitled user through a sequential confirmation process in which the product serial number of the software, collision, execution and IP address are checked and an inquiry into the validity of the user is conducted. The license server then transmits a permission or refusal notice to the client PC in order to allow or prevent the use of the software so that the copyright of the software can be protected.

Further, one example of a technique for authenticating a genuine product using a CD key is described in Korean Patent Laid-open Publication No. 2005-0052980 published on Jun. 7, 2006 and entitled "Method for electronically producing a serial number comprising the identification of the software, contents or electronic information, method for publishing a coupon on which said serial number is printed and method for decrypting said serial number, and computer-readable recording medium which records the program executing said method."

In the technique disclosed in Korean Patent Laid-open Publication No. 2005-0052980, a serial number capable of identifying the authenticity of a software-based product is generated, and identification is carried out using the generated serial number. In particular, the identification method comprises the steps of receiving a generated final serial number, decoding the received serial number, extracting variables and the solution of a specific functional equation from the decoded serial number, determining whether the solution satisfies the specific functional equation already established between a serial number generation server and an identification server, and confirming whether the extracted variables include identifiers of the software, contents or electronic information. In the technique disclosed in Korean Patent Laid-open Publication No. 2005-0052980, since identification can be reliably conducted while there is no communication online between an entitling server and a contents providing server, the identification process is not adversely influenced by network problems or exposure of a serial number to possible hacking. Further, because the intervention of an intermediate settlement server is not necessary, fees can be saved, and the privacy of the contents provider and business proprietary can be securely protected.

However, in the techniques disclosed in the publications, problems are caused in that there are no measures to prevent illegal use of a program when the online authentication is evaded or the CD key is shared. That is to say, when an entitled user intervenes in the authentication or openly discloses the information or CD key necessary for decoding, other persons can easily gain illegal access to the program.

In the case of hardware, a user must be in physical possession of the hardware to utilize its function, and hardware is not easily reproduced. However, in the case of software, original copies can easily be reproduced and distributed without the consent of the copyright holder. In this connection, in a conventional installation method using a CD-ROM drive, illegal reproduction and distribution has been possible.

SUMMARY OF THE INVENTION

Accordingly, the present invention has been made to solve the above-mentioned problems occurring in the prior art, and an object of the present invention is to provide a data recognition apparatus for copy protection which allows software to be distributed while being separately coded in a disc with an RFID tag attached and a USB memory device and solely recognizes the software similar to hardware, thereby protecting the software from illegal copying, a method thereof, and storage mediums therefor. Thus, since the disc and the USB memory device are distributed as a pair to be solely recognized with respect to each other, even when one of them is compromised, the execution of the program is made impossible.

Another object of the present invention is to provide a data recognition apparatus for copy protection which decodes data from storage mediums separated from each other using an RFID reader and a USB port and provides the driving data stored in a USB memory to a user while concealing the main data stored on a disc, thereby protecting the software from illegal copying, a method thereof, and storage mediums therefor.

Still another object of the present invention is to provide a data recognition apparatus for copy protection which prevents the driving data stored in a USB memory from being transmitted to a local hard disc, thereby protecting the software from illegal copying, a method thereof, and storage mediums therefor.

In order to achieve the above objects, in one aspect, the present invention provides a data recognition apparatus connected to a system for executing data stored in a storage medium and functioning to recognize the data, the apparatus comprising: (a) a disc insertion section for recognizing a first storage medium having the shape of a disc with an RFID tag attached; (b) an RFID reading section for reading the RFID tag; (c) a USB port section for recognizing a second storage medium in the form of a USB memory; (d) a decoding section for decoding data stored in the first storage medium or the second storage medium; and (e) a transmission section for transmitting the decoded data to the system.

In a preferred embodiment, the decoding section may decode the data stored in the first storage medium and the second storage medium using first code information recognized in the RFID reading section and second code information recognized in the USB port section.

Preferably, the first storage medium and the second storage medium may code and store a software, and may be provided as a pair for decoding.

The first storage medium may suitably include main data of the software, and the second storage medium may suitably include driving data for driving the main data.

Preferably, the second storage medium may further include a transmission prevention section for controlling the driving data so as not to be transmitted to a local disc of the system.

Desirably, the transmission section may command a display device of the system to display only the driving data.

In a preferred example, the first storage medium may comprise a CD-ROM, and the apparatus may further comprise a performing section for performing a function of a CD-ROM drive.

In another aspect, the present invention provides a data recognition apparatus connected to a system for executing data stored in a storage medium and functioning to recognize the data, the apparatus comprising: (a) a disc insertion section for recognizing a storage medium having the shape of a disc with an RFID tag attached; (b) an RFID reading section for recognizing the RFID tag; (c) a decoding section for decoding data stored in the storage medium; and (d) a transmission section for transmitting the decoded data to the system.

Preferably, the decoding section may decode the data stored in the storage medium using code information recognized by the RFID reading section.

In still another aspect, the present invention provides a copy protection method using a data recognition apparatus which is connected to a system for executing data stored in a storage medium, including a disc insertion section for recognizing a first storage medium having the shape of a disc with an RFID tag attached, a USB port section for recognizing a second storage medium in the form of a USB memory, a decoding section for decoding coded data, and a transmission section for transmitting the decoded data to the system, and functions to recognize the data, the method comprising the steps of: (a) determining whether a storage medium inserted into the data recognition apparatus is the first storage medium or the second storage medium; (b) recognizing the first storage medium through the disc insertion section when the first storage medium is inserted; (c) recognizing the second storage medium through the USB port section when the second storage medium is inserted; (d) decoding data stored in the first storage medium and the second storage medium through the decoding section when both the first storage medium and the second storage medium are recognized; and (e) transmitting the decoded data through the transmission section to the system.

In a preferred embodiment, the first storage medium and the second storage medium may code and store a software, and may be provided as a pair for decoding.

In another preferred embodiment, the data recognition apparatus may further include an RFID reading section, and the step of recognizing the first storage medium may comprise the steps of: recognizing the first storage medium through the disc insertion section; recognizing the RFID tag through the RFID reading section; and transmitting first code information included in the recognized RFID tag to the decoding section through the RFID reading section.

In still another preferred embodiment, the step of recognizing the second storage medium may comprise the steps of: recognizing the second storage medium; and transmitting second code information stored in the second storage medium to the decoding section.

In a further preferred embodiment, the decoding step may comprise the steps of: receiving the first code information and the second code information from the RFID reading section and the USB port section; and decoding the data stored in the first storage medium and the second storage medium using the first code information and the second code information.

In yet another preferred embodiment, the first storage medium may include main data of the software, and the second storage medium may include driving data for driving the main data.

In such embodiment, in the transmitting step, the transmission section may command a display device of the system to display only the driving data.

Also, the second storage medium may preferably further include a transmission prevention section, and the copy protection method may further comprise the step of controlling the driving data through the transmission prevention section so as not to be transmitted to a local disc of the system when the data recognition apparatus receives a data transmission request from the system.

In a preferred embodiment, the first storage medium may comprise a CD-ROM, and the apparatus may further comprise a performing section for performing a function of a CD-ROM drive.

In still another aspect, the present invention provides a data recognition apparatus connected to a system for executing data stored in a storage medium and functioning to recognize the data, wherein the apparatus prevents the copy of digital media contents using a first storage medium having the shape of a disc with an RFID tag attached and a second storage medium in the form of a USB memory.

In a further aspect, the present invention provides a computer readable recording medium storing a computer program for performing a copy protection method using a data recognition apparatus which is connected to a system for executing data stored in a storage medium and functioning to recognize the data and which includes: a disc insertion section for recognizing a storage medium having the shape of a disc with an RFID tag attached; an RFID reading section for recognizing the RFID tag; a decoding section for decoding data stored in the storage medium; and a transmission section for transmitting the decoded data to the system, the program causing the apparatus to perform the method comprising the steps of: (a) determining whether a storage medium inserted into the data recognition apparatus is the first storage medium or the second storage medium; (b) recognizing the first storage medium through the disc insertion section when the first storage medium is inserted; (c) recognizing the second storage medium through the USB port section when the second storage medium is inserted; (d) decoding data stored in the first storage medium and the second storage medium through the decoding section when both the first storage medium and the second storage medium are recognized; and (e) transmitting the decoded data through the transmission section to the system.

The main contents of the present invention are divided into the development of the data recognition apparatus in which the RFID reader and the USB port are built, the hardware technology for displaying only the driving data stored in the USB memory to the user rather than the main data stored on the disc, the hardware technology for preventing the information stored in the USB memory from being transmitted to the local hard disc, and hardware decoding technology for using codes stored in the RFID tag.

BRIEF DESCRIPTION OF THE DRAWINGS

The above and other objects, features and advantages of the present invention will be more apparent from the following detailed description when taken in conjunction with the accompanying drawings, in which:

FIGS. 2a through 2c are block diagrams illustrating internal configurations of the data recognition apparatus and storage mediums in accordance with the embodiment of the present invention;

FIG. 3 is a flow chart explaining a method for copy protection in accordance with another embodiment of the present invention.

DETAILED DESCRIPTION OF PREFERRED EMBODIMENTS

Figure 1A:
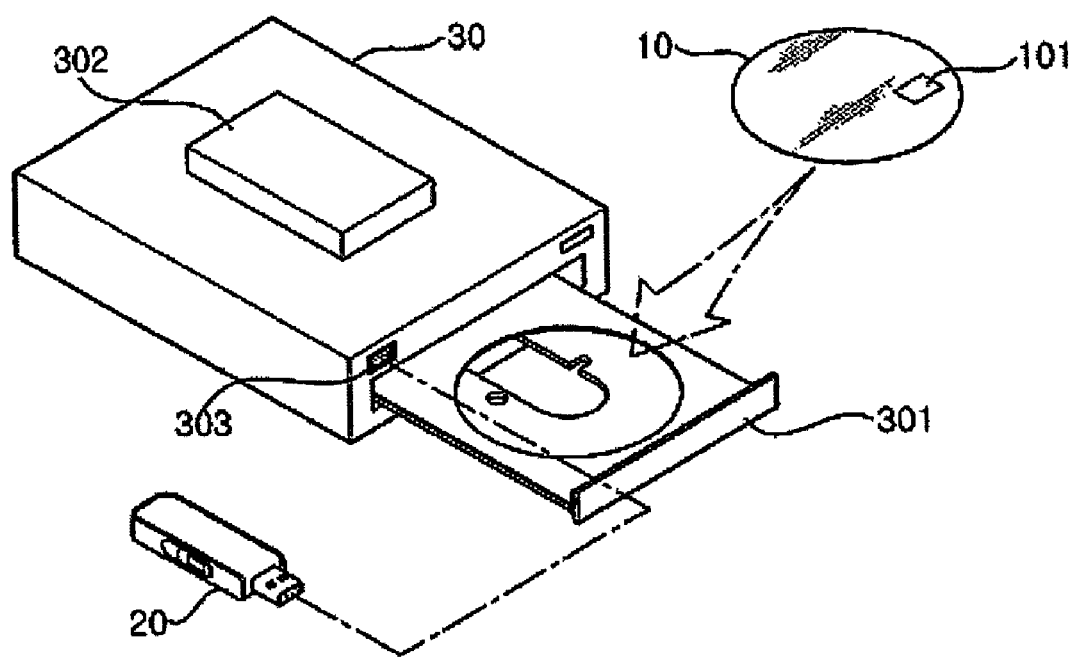
FIGS. 1a and 1b are perspective views illustrating data recognition apparatuses for copy protection in accordance with an embodiment of the present invention.

Hereinafter, preferred embodiments of the present invention will be described with reference to the accompanying drawings. In the following description and drawings, the same reference numerals are used to designate the same or similar components, and so repetition of the description of the same or similar components will be omitted.

Figure 1B:
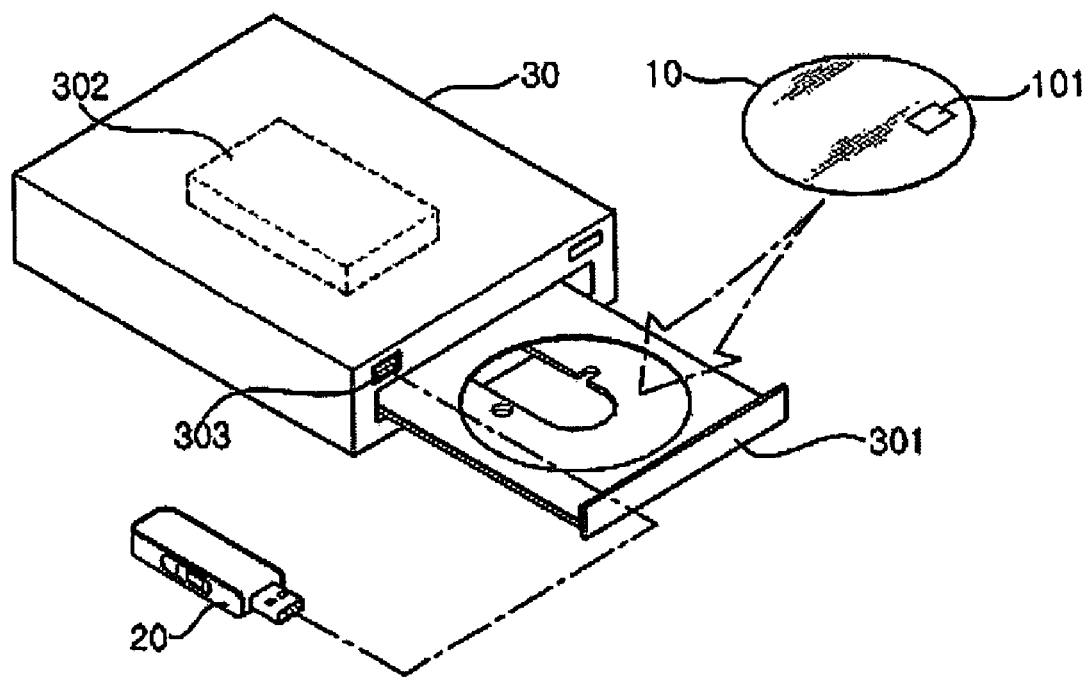

A data recognition apparatus for copy protection in accordance with an embodiment of the present invention will be described with reference to FIGS. 1a, 1b and 2a through 2c. FIGS. 1a and 1b are perspective views illustrating data recognition apparatuses for copy protection in accordance with an embodiment of the present invention. Referring to FIG. 1a, a data recognition apparatus 30 for copy protection in accordance with an embodiment of the present invention is connected to a system for executing data stored in a first storage medium 10 and a second storage medium 20, and functions to recognize and transmit the stored data to the system. The data recognition apparatus 30 for copy protection includes a disc insertion section 301 for recognizing the first storage medium 10 having the shape of a disc with an RFID tag 101 attached, an RFID reading section 302 for reading the RFID tag 101, and a USB port section 303 for recognizing the second storage medium 20 in the form of a USB memory. While the USB port section 303 for recognizing the second storage medium 20 can be separately formed as shown in FIG. 1a, a conventional common USB port provided to a computer can be alternatively used.

The RFID reading section 302 can be attached to the data recognition apparatus 30 to project as shown in FIG. 1a or to be included in the data recognition apparatus 30 as shown in FIG. 1b. The disc insertion section 301, the RFID reading section 302 and the USB port section 303 can be provided to the data recognition apparatus 30 while having various shapes on desired positions.

The data recognition apparatus 30 can be realized in various configurations. For example, in the case where the first storage medium 10 is a CD-ROM, the data recognition apparatus 30 can comprise a CD-ROM drive.

Figure 2A:
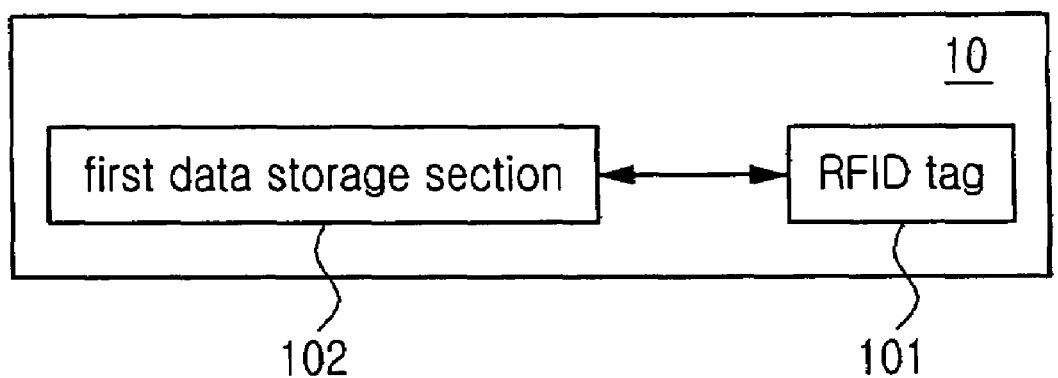
Figure 2B:
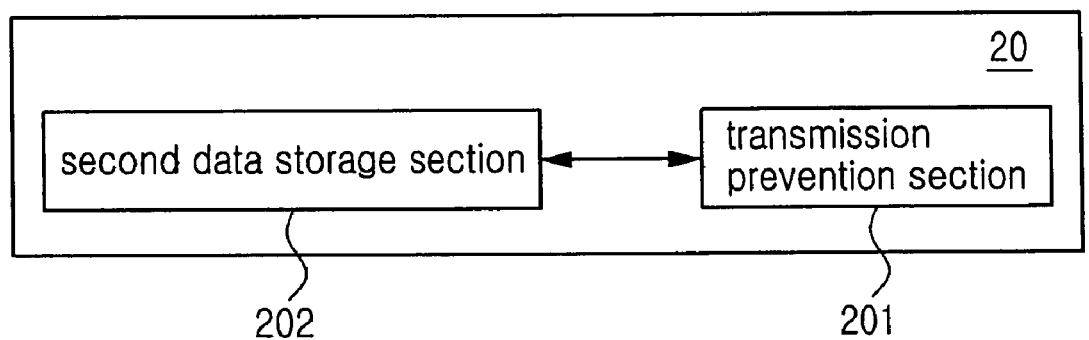

FIGS. 2a through 2c are block diagrams illustrating internal configurations of the data recognition apparatus and storage mediums in accordance with the embodiment of the present invention.

Referring to FIG. 2a, the first storage medium 10 according to the present invention comprises the RFID tag 101 which stores information regarding the data stored in the first storage medium 10 and first code information used for preventing illegal copying of the data, and a first data storage section 102 which stores coded main data constituting the substance of software and including important information and contents. The information stored in the first data storage section 102 is stored in a coded state, and only when the information of the RFID tag 101 read by the RFID reading section 302 corresponds to the information stored in the first data storage section 102, the contents of the information stored in the first data storage section 102 can be decoded. After the information of the RFID tag 101 is confirmed through the RFID reading section 302, the data stored in the second storage medium 20 is recognized in the form of hardware.

Referring to FIG. 2b, the second storage medium 20 according to the present invention comprises a transmission prevention section 201 which controls the data stored in the second storage medium 20 not to be transmitted to the local disc of the system connected to the data recognition apparatus 30, and a second data storage section 202 which stores second code information used for preventing illegal copying of the data and coded driving data for driving the main data stored in the first storage medium 10.

Therefore, the first storage medium 10 and the second storage medium 20 according to the present invention together code and store software, and are provided as a pair for decoding. That is to say, only when both the first storage medium 10 and the second storage medium 20 are inserted into the data recognition apparatus 30, can the distributed software be executed. If the information of the RFID tag 101 is not provided, the contents stored in the second storage medium 20 cannot be confirmed. That is to say, the driving data of the software stored in the second storage medium 20 cannot be read without the information of the RFID tag 101 attached to the first storage medium 10. Also, since the first storage medium 10 cannot be solely decoded without the key stored in the RFID tag 101, even when the first storage medium 10 is copied, the program cannot be executed.

As described above, the distributed software is divided and stored in the first storage medium 10 and the second storage medium 20. For example, when the distributed software is software for installing a program A, data files, document files, configuration files, image files, information files, etc., which are necessary for the installation of main data, are stored in the first storage medium 10, and an install file or a setup file as driving data is stored in the second storage medium 20. In other words, only the driving data is stored in the second storage medium 20, and the driving data is executed in concert with the various files stored in the first storage medium 10 to install the program A to the local disc of the system. At this time, only the driving data stored in the second storage medium 20 is displayed to a user, and the main data stored in the first storage medium 10 is concealed. Therefore, as the main contents of the software are concealed to the user and are processed similar to hardware in this way, illegal copying of the software can be prevented.

FIG. 2c illustrates the data recognition apparatus 30 for copy protection in accordance with the embodiment of the present invention.

In addition to the disc insertion section 301, the RFID reading section 302 and the USB port section 303, the data recognition apparatus 30 for copy protection according to the present invention as shown in FIG. 2c comprises a decoding section 304 for decoding the data stored in the first storage medium 10 and the second storage medium 20 using the first code information recognized by the RFID reading section 302 and the second code information recognized by the USB port section 303, a transmission section 305 for transmitting the decoded data stored in the first storage medium 10 and the second storage medium 20 to the system connected to the data recognition apparatus 30, and a control section 306 for controlling the disc insertion section 301, the RFID reading section 302, the USB port section 303, the decoding section 304, the transmission section 305, and the inside of the data recognition apparatus 30.

The distributed software is divided and stored in the first storage medium 10 and the second storage medium 20 in an initial data storing stage, and at this time, code information is stored in the respective first and second storage mediums 10 and 20 so that the code information stored in the respective first and second storage mediums 10 and 20 are solely recognized with respect to each other. Namely, through physical recognition of the first storage medium 10 and through recognition of the information stored in the RFID tag 101, the driving data coded in the second storage medium 20 can be decoded. Since the coding and decoding techniques are well known in the art, concrete descriptions thereof will be omitted. Because the driving data stored in the second storage medium 20 is solely used to decode the main data stored in the first storage medium 10 distributed along with the second storage medium 20, the first storage medium 10 and the second storage medium 20 can be recognized similar to hardware solely with respect to each other. At this time, the data recognition apparatus 30, in which the RFID reading section 302 and the USB port section 303 are built, decodes and executes the coded software by using the information of the RFID tag 101 similar to hardware.

Also, the transmission section 305 commands the display device of the system connected to the data recognition apparatus 30 to display only the driving data stored in the second storage medium 20, so that the entire software is not exposed to illegal copying.

In the above embodiment, while the data recognition apparatus for copy protection is realized using two storage mediums, that is, the disc-shaped storage medium and the USB memory-form storage medium, a data recognition apparatus for copy protection according to a variation of the present invention can be realized only using a disc-shaped storage medium. In this case, the data recognition apparatus for copy protection includes a disc insertion section for recognizing a storage medium having the shape of a disc with an RFID tag attached, an RFID reading section for recognizing the RFID tag, a decoding section for decoding the data stored in the storage medium, and a transmission section for transmitting the decoded data stored in the storage medium to a system. In the data recognition apparatus configured in this way, as the disc-type storage medium with the RFID tag attached is inserted into the disc insertion section, the RFID reading section reads the RFID tag, and only when the information of the RFID tag corresponds to the data stored in the storage medium, the data stored in the storage medium can be recognized.

Next, a copy protection method in accordance with another embodiment of the present invention will be described with reference to FIG. 3. FIG. 3 is a flow chart explaining a method for copy protection in accordance with another embodiment of the present invention. Referring to FIG. 3, the first storage medium 10 or the second storage medium 20 is inserted into the disc insertion section 301 or the USB port section 303 of the data recognition apparatus 30. The control section 306 determines whether the inserted storage medium is the first storage medium 10 or the second storage medium 20 (ST3010). Since the contents stored in the first storage medium 10 have been coded, the second storage medium 20 distributed together with the first storage medium 10 is inserted into the USB port section 303 to initiate the RFID reading section 302, and then, the information of the RFID tag 101 attached to the first storage medium 10 is read. In more detail, if it is determined in step 3010 that the first storage medium 10 is inserted, the disc insertion section 301 recognizes the first storage medium 10 (ST3020), and the RFID reading section 302 recognizes the RFID tag 101 (ST3021). The RFID reading section 302 transmits the first code information included in the recognized information of the RFID tag 101 to the decoding section 304 (ST3022). If it is determined in step 3010 that the second storage medium 20 is inserted, the USB port section 303 recognizes the second storage medium 20 (ST3030), and transmits the second code information stored in the second storage medium 20 to the decoding section 304 (ST3031).

If it is determined that both the first storage medium 10 and the second storage medium 20 are recognized through the above steps (ST3040), the decoding section 304 decodes the data stored in the first storage medium 10 and the second storage medium 20 (ST3050). For decoding, the decoding section 304 receives the first code information and the second code information which are respectively transmitted from the RFID reading section 302 and the USB port section 303. Next, the decoding section 304 decodes the data stored in the first storage medium 10 and the second storage medium 20 using the received first and second code information. Since the first and second code information is provided as a pair for the purpose of coding and decoding, the decoding section 304 decodes the data coded in the first storage medium 10 and the second storage medium 20 using both first and second code information. That is to say, because the first storage medium 10 and the second storage medium 20 which are distributed as a pair are manufactured to be solely recognized with respect to each other, even when one of them is compromised, the software can be protected from illegal copying.

If decoding is completed, the transmission section 305 transmits the decoded data stored in the first storage medium 10 and the second storage medium 20 to the system so that a program can be executed. At this time, the transmission section 350 transmits, along with the data, a command for displaying only the driving data stored in the second storage medium 20 to the display device of the system so that the main data can be concealed. Since a user can drive the software with the driving data, a software designer can protect the software by concealing the main data.

If the data recognition apparatus 30 receives a data transmission request from the system, the transmission prevention section 201 controls the driving data not to be transmitted to the local disc of the system. That is to say, the data stored in the second storage medium 20 is handled similar to hardware to be prevented from being transmitted to a local disc drive so that illegal installation of the software through cracking is prevented.

Figure 4:
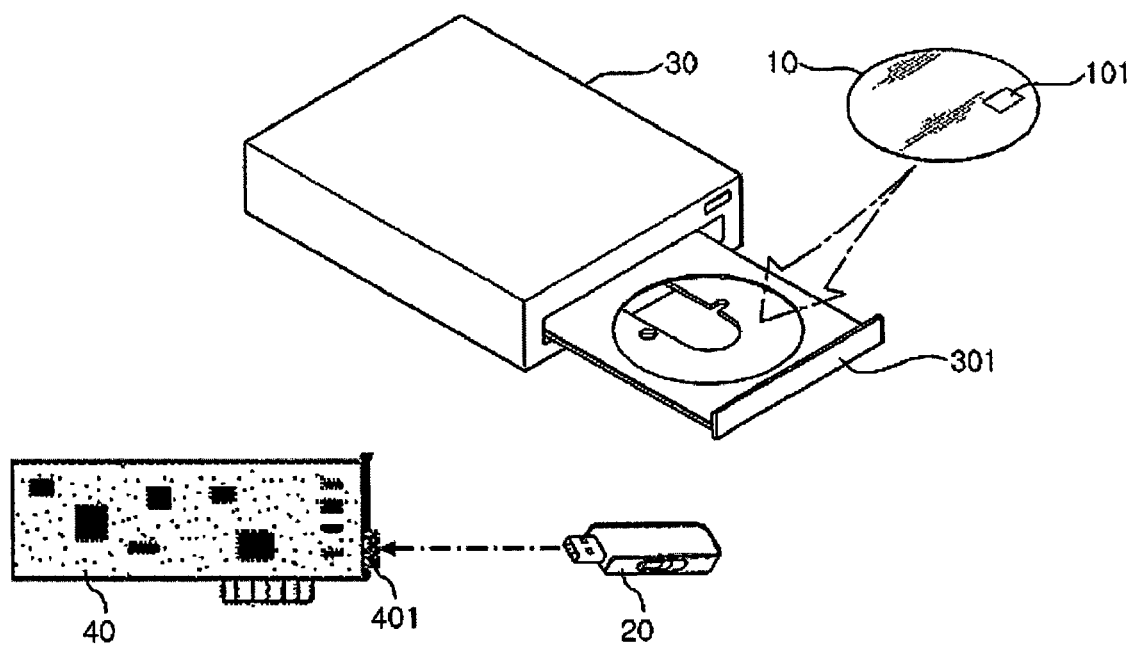
FIG. 4 is a view illustrating a method for copy protection of digital media contents in accordance with still another embodiment of the present invention.

FIG. 4 is a view illustrating a method for copy protection of digital media contents in accordance with still another embodiment of the present invention.

Referring to FIG. 4, the copy protection method according to the present invention can be expansively applied to digital media contents such as a sound source or a moving picture. In the ubiquitous environment which will be realized in the future, since an individual can carry a sole ID in a state in which it is stored in an RFID tag or a smart card, necessary information can be automatically stored in the RFID tag 101 of the distributed disc 10, and driving data capable of driving digital contents is stored in the USB memory 20. This data outputs a user's ID stored in the RFID tag 101 along with the contents as a watermark or a finger print during execution. A difference between the present method and the conventional method is that the procedure is implemented similar to hardware without intervention of the user, whereby it is possible to prevent illegal distribution of the contents.

In other words, in the case where the first storage medium 10 is a CD-ROM or a DVD for storing a sound source or a moving picture, the data recognition apparatus 30 may be a CD player or a DVD player. Accordingly, if the distributed software is a DVD title, the DVD title as main data is stored in the first storage medium 10, and a DVD title driving program as driving data is stored in the second storage medium 20. Namely, the driving data stored in the second storage medium 20 is displayed to the user and cooperates with the main data stored in the first storage medium 10 to display a moving picture. At this time, the second recording medium 20 is connected to a USB port section 401 which is provided to a graphic card being a media interfacing device, to prevent the moving picture from being captured.

For another example, if the distributed software is an MP3 sound source, the MP3 sound source as main data is stored in the first storage medium 10, and an MP3 sound source driving program as driving data is stored in the second storage medium 20. At this time, the second recording medium 20 is connected to the USB port section 401 which is provided to a sound card being a media interfacing device, to prevent the sound source from being captured.

In the present invention, since it is possible to make software to be solely recognized similar to hardware, the present invention can be applied for protection of software and digital contents. Recently, as RFID is increasingly being used for personal identification in the ubiquitous environments, by allowing a fingerprint or a watermark to be automatically inserted into digital contents for an individual, the illegal distribution of the digital contents can be prevented. In particular, in the case of software distributed which is protected intellectual property, the software can be protected similar to hardware using the information of the RFID tag. The main reason why software is not properly protected is that the software cannot be solely handled similar to hardware. In this regard, the present invention solves the problem by handling the software similar to hardware.

It is anticipated that the present invention can be used in various application fields such as electronic commerce, document exchange, information sharing, etc. in a wireless Internet environment or the ubiquitous environments recently highlighted, so as to provide efficient service for contents protection.

As is apparent from the above descriptions, the data recognition apparatus for copy protection, the method thereof, and the storage mediums therefor according to the present invention provide advantages in that, since software is distributed while being separately coded in a disc with an RFID tag attached and a USB memory device and is solely recognized similar to hardware, authentication required for the installation of a program can be implemented similar to hardware without the intervention of a user, whereby it is possible to protect the software from illegal copying.

Also, due to the fact that only the driving data stored in the USB memory device is provided to the user and the main data stored on the disc is concealed, it is possible to protect the software from illegal copying. Further, because the driving data stored in the USB memory device is prevented from being transmitted to a local hard disc, it is possible to protect the software from illegal copying.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A data recognition apparatus connected to a system for executing data stored in a storage medium and functioning to recognize the data, comprising:
   a disc insertion section for recognizing a first storage medium having the shape of a disc with an RFID tag attached;
   an RFID reading section for reading the RFID tag;
   a USB port section for recognizing a second storage medium in the form of a USB memory;
   a decoding section for decoding data stored in the first storage medium or the second storage medium; and
   a transmission section for transmitting the decoded data to the system,
   wherein the decoding section decodes the data stored in the first storage medium and the second storage medium using first code information recognized in the RFID reading section and second code information recognized in the USB port section,
   both the first storage medium and the second storage medium must be inserted into the data recognition apparatus in order to execute software divided and stored in the first storage medium and the second storage medium, the first storage medium includes main data of the software, and the second storage medium includes driving data for driving the main data, the transmission section commands a display device of the system to display only the driving data, and the display device of the system displays only the driving data stored in the second storage medium, and conceals the main data stored in the first storage medium.

2. The apparatus according to claim 1, wherein the second storage medium further includes a transmission prevention section for controlling the driving data so as not to be transmitted to a local disc of the system.

3. The apparatus according to claim 1, wherein the first storage medium comprises a CD-ROM, and the apparatus further comprises a performing section for performing a function of a CD-ROM drive.

4. A copy protection method using a data recognition apparatus which is connected to a system for executing data stored in a storage medium, including a disc insertion section for recognizing a first storage medium having the shape of a disc with an RFID tag attached, a USB port section for recognizing a second storage medium in the form of a USB memory, a decoding section for decoding coded data, and a transmission section for transmitting the decoded data to the system, and functions to recognize the data, the method comprising the steps of:

determining whether a storage medium inserted into the data recognition apparatus is the first storage medium or the second storage medium;

recognizing the first storage medium through the disc insertion section when the first storage medium is inserted;

recognizing the second storage medium through the USB port section when the second storage medium is inserted;

decoding data stored in the first storage medium and the second storage medium through the decoding section only when both the first storage medium and the second storage medium are inserted in the data recognition apparatus and recognized; and transmitting the decoded data through the transmission section to the system in order to execute software divided and stored in the first storage medium and the second storage medium, wherein the data recognition apparatus further includes an RFID reading section, the step of recognizing the first storage medium comprises the steps of:

recognizing the first storage medium through the disc insertion section;

recognizing the RFID tag through the RFID reading section; and transmitting first code information included in the recognized RFID tag to the decoding section through the RFID reading section, the first storage medium includes main data of the software, and the second storage medium includes driving data for driving the main data, in the transmitting step, the transmission section commands a display device of the system to display only the driving data, and the display device of the system displays only the driving data stored in the second storage medium, and conceals the main data stored in the first storage medium.

5. The method according to claim 4, wherein the step of recognizing the second storage medium comprises the steps of:

recognizing the second storage medium; and transmitting second code information stored in the second storage medium to the decoding section.

6. The method according to claim 4, wherein the decoding step comprises the steps of:

receiving the first code information and the second code information from the RFID reading section and the USB port section; and decoding the data stored in the first storage medium and the second storage medium using the first code information and the second code information.

7. The method according to claim 4, wherein the second storage medium further includes a transmission prevention section, and wherein the copy protection method further comprises the step of controlling the driving data through the transmission prevention section so as not to be transmitted to a local disc of the system when the data recognition apparatus receives a data transmission request from the system.

8. The method according to claim 4, wherein the first storage medium comprises a CD-ROM, and the apparatus further comprises a performing section for performing a function of a CD-ROM drive.

* * * * *